United States Patent [19]

Ushiro et al.

[11] Patent Number: 4,621,324

[45] Date of Patent: Nov. 4, 1986

[54] PROCESSOR FOR CARRYING OUT VECTOR OPERATION WHEREIN THE SAME VECTOR ELEMENT IS USED REPEATEDLY IN SUCCESSION

[75] Inventors: Yasunori Ushiro, Yokosuka; Shigeo Nagashima, Hachioji; Shun Kawabe, Machida, all of Japan

[73] Assignee: Hitachi, Ltd., Tokyo, Japan

[21] Appl. No.: 562,224

[22] Filed: Dec. 16, 1983

[30] Foreign Application Priority Data

Dec. 17, 1982 [JP] Japan .............................. 57-221392

[51] Int. Cl.[4] .............................................. G06F 13/00
[52] U.S. Cl. .................................................... 364/200
[58] Field of Search ................. 364/200 MS File, 736

[56] References Cited

U.S. PATENT DOCUMENTS 4,128,880 12/1978 Cray, Jr. ............................. 364/200
4,172,287 10/1979 Kawabe et al. .................... 364/736
4,435,765 3/1984 Uchida et al. ...................... 364/200
4,490,786 12/1984 Nakatani ............................ 364/200

*Primary Examiner*—David H. Malzahn
*Attorney, Agent, or Firm*—Antonelli, Terry & Wands

[57] ABSTRACT

A vector processor provided wtih a vector register to set therein vector element data having been stored in a main storage, prior to a vector operation, is disclosed in which control information indicating whether new element data is read out from the main storage to be set in one location of the vector register capable of storing one vector element data and to be latched, or vector element data having been latched is set in the above location, is set in a mask register, for each location of the vector register, and the control information is successively read out from the mask register, to set vector element data in the vector register in accordance with the read-out control information.

3 Claims, 6 Drawing Figures

PROCESSOR FOR CARRYING OUT VECTOR OPERATION WHEREIN THE SAME VECTOR ELEMENT IS USED REPEATEDLY IN SUCCESSION

BACKGROUND OF THE INVENTION

The present invention relates to a vector processor suited to process data having the form of a matrix (namely, vector data) at high speed.

Various vector processors have been proposed which can process, at high speed, large-scale matrix calculation frequently appearing in scientific and technical calculation. One of the vector processors includes vector registers and has a chaining function for them, in order to improve the high-speed, parallel processing carried out by a plurality of pipe-line arithmetic units (refer to, for example, U.S. Pat. No. 4,128,880).

In the above vector processor, data stored in a main storage is stored in vector registers, and then transferred to an arithmetic unit. Further, the intermediate result of a vector operation is also temporarily stored therein, and only the final result of the vector operation is sent to the main storage. Therefore, the vector register is very effective for increasing the transfer rate of data used in the vector operation.

However, the performance of the vector processor is greatly deteriorated when a bank conflict occurs. This fact will be explained below in detail. The main storage of the vector processor is formed of a plurality of banks which can operate in parallel and independently of each other, in order to enhance the rate of data transfer between the main storage and each vector register. The term "bank comflict" means the concentrated access to the same bank. When a bank conflict occurs, reading out of data is serially carried out, and therefore the amount of data transferred between the main storage and vector register in a unit time is decreased. In other words, when successive accesses to the same address are required, a bank conflict occurs, since it is impossible to simultaneously read out a plurality of data from the same location.

For example, in an unstationary, nonlinear analysis, it is required to carry out the triangular decomposition for a band matrix having a small band width, at high speed. In such a vector operation, it frequently happens that the same data is repeatedly used. In this case, the same bank in a main storage is successively accessed, so that a bank conflict occurs, and therefore the processing speed of vector processor is decreased.

SUMMARY OF THE INVENTION

It is an object of the present invention to provide a vector processor which can prevent a bank conflict from occurring, and therefore has high processing efficiency.

In order to attain the above object, according to the present invention, in the case where vector data formed of a plurality of element data is read out from a main storage and then stored in a vector register, information is prepared which indicates whether the same element data is to be successively stored in the vector register or not. Further, when the information indicates that new element data is to be stored in the vector register, the new element data is read out from the main storage, and then is not only stored in the vector register but also is latched. When the information indicates that element data having been previously read out from the main storage is to be stored in the vector register, element data having been latched is stored in the vector register.

DESCRIPTION OF THE PREFERRED EMBODIMENT

Figure 1:
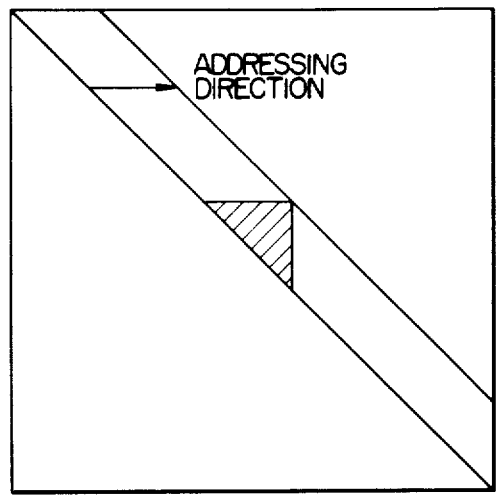
FIG. 1 is a view showing an example of a band matrix.
Figure 2:
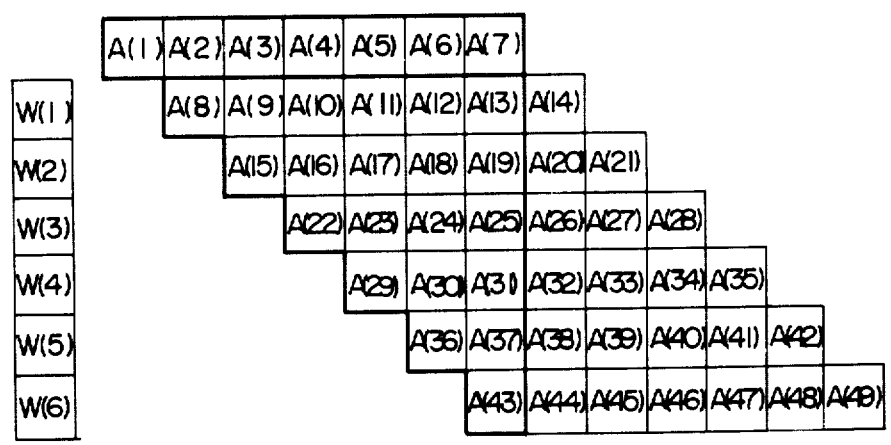
FIG. 2 is a view showing an example of a vector operation for a band matrix.

An example of a vector operation which can be performed by a vector processor according to the present invention, will be explained with reference to FIGS. 1 and 2. FIG. 1 shows an example of a band matrix. A band matrix includes effective data in the form of a narrow, long strip, as shown in FIG. 1. FIG. 2 is not only an enlarged view of part of the band matrix shown in FIG. 1, but also a view for explaining an example of a vector operation. In FIG. 2, a portion bounded by a heavy border corresponds to the hatched area shown in FIG. 1. In the band matrix, addresses are assigned to matrix elements in such a manner that addresses are increased in each of row and column directions, as shown in FIG. 2. Now, let us consider the case where a vector operation is performed between the vector elements bounded by the heavy border and vector elements $W(0)$ to $W(6)$ which are parts of another vector. First, a value obtained by subtracting a product $W(1) \times A(i+1)$ from an element $A(7+i)$ is substituted for the element $A(7+i)$, where $i=1$ to 6. Then, a value $A(14+i) - W(2) \times A(i+2)$ is substituted for an element $A(14+i)$, where $i=1$ to 5. Similarly, elements $A(21+i)$, $A(28+i)$ and $A(35+i)$ are replaced by new values. Finally, a value $A(42+i) - W(6) \times A(i+6)$ is substituted for an element $A(42+i)$, where $i=1$. Thus, the vector operation between the elements bounded by the heaving border and the elements $W(1)$ to $W(6)$ is completed. Next, a similar operation is performed between vector elements of another vector other than the vector elements $W(1)$ to $W(6)$ and elements which are bounded by the heavy border having been shifted by one element in the direction toward the lower right end of the band matrix. Such an operation is repeated until the heavy border reaches the end of the band matrix. In the first operation, the element $W(1)$ is successively used six times. Further, the elements $W(2)$, $W(3)$, $W(4)$ and $W(5)$ are successively used five, four, three and two times, respectively. The element $W(6)$ is used only once.

Figure 3:
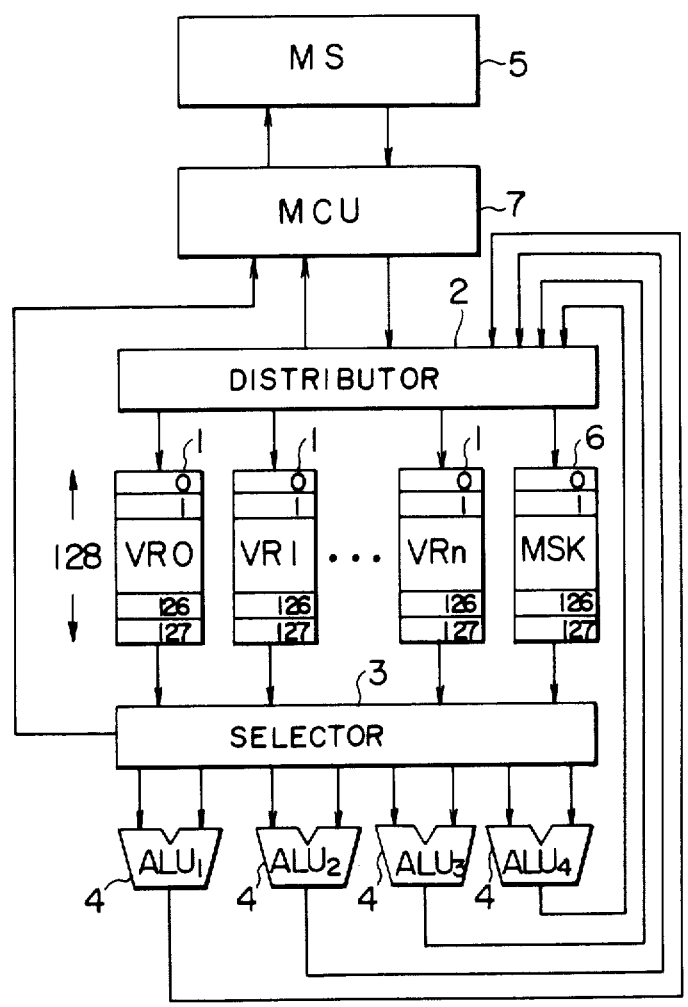
FIG. 3 is a block diagram showing the circuit configuration of a vector processor.

FIG. 3 shows the whole structure of a vector processor, to which the present invention is applied. In FIG. 3, reference numeral 1 designates vector registers, 2 a data distributor, 3 a data selector, 4 arithmetic and logic units, 5 a main storage, 6 a mask register, and 7 a memory control unit. Each of the vector registers 1 can store therein a series of element data (hereinafter simply referred to as "data") forming a vector. In this vector processor, each vector register 1 is capable of storing 128 data each having a length of 8 bytes.

A vector instruction stored in the main storage 5 is fetched into the memory control unit 7, to be decoded therein. When the vector instruction is decoded, data necessary for a vector operation is read out from the main storage 5, and taken in a vector register 1 through the data distributor 2. The data taken in the vector register 1 is sent to a desired arithmetic and logic unit 4 through the data selector 3, to be subjected to an operation. The result of the operation is again written in the vector register 1. Each of the arithmetic and logic units is an independent unit such as a floating-point adder or a floating-point multiplier. In this vector processor, units ALU 1 and ALU 2 are adders, a unit ALU 3 is a multiplier and a unit ALU 4 is a multiplier-divider.

Such data transfer between the arithmetic and logic unit 4 and vector register 1 is repeatedly carried out, and the final result thus obtained is sent from the vector register 1 to the main storage 5 through the data selector 3 and memory control unit 7, to be written in the main storage 5.

Let us consider the case where vectors a and b are added to each other and the result of addition is stored in a location of the main memory as vector c, by way of example. In this case, the following instructions are used.

1. LVR VR0, a  (Store a vector a in a vector register VR0)
2. LVR VR2, b  (Store a vector b in a vector register VR2)
3. VEM VR4, VR0, VR2 (Store a + b in a vector register VR4)
4. STVR VR4, c (store the result of a + b in an allocated area of the main memory for a vector c )

In more detail, in the first processing, the vector a existing in the main storage 5 is stored in the vector register VR0. Next, in the second processing, the vector b existing in the main storage 5 is stored in the vector register VR2. Then, in the third processing, the contents of the vector register VR0 are added to those of the vector register VR2 and the result of addition is stored in the vector register VR4. When all of addition is completed, the fourth processing is carried out, that is, the contents of the vector register VR4 are substituted for the vector c existing in the main storage 5.

The outline of the conventional processing which makes use of a vector register, has been explained in the above, and therefore the detailed explanation thereof will be omitted.

Fundamentally speaking, the same processing as mentioned above is carried out in accordance with the present invention. However, a characteristic feature of the present invention resides in a control operation to read out vector data from a main storage and set in a vector register.

The mask register 6 shown in FIG. 3 is additionally provided in accordance with the present invention, and is used in the case where an appropriate number of element data which are identical with each other and indicate a vector element of the vector a or b stored in the main storage 5, are stored in the vector register 1.

Figure 4:
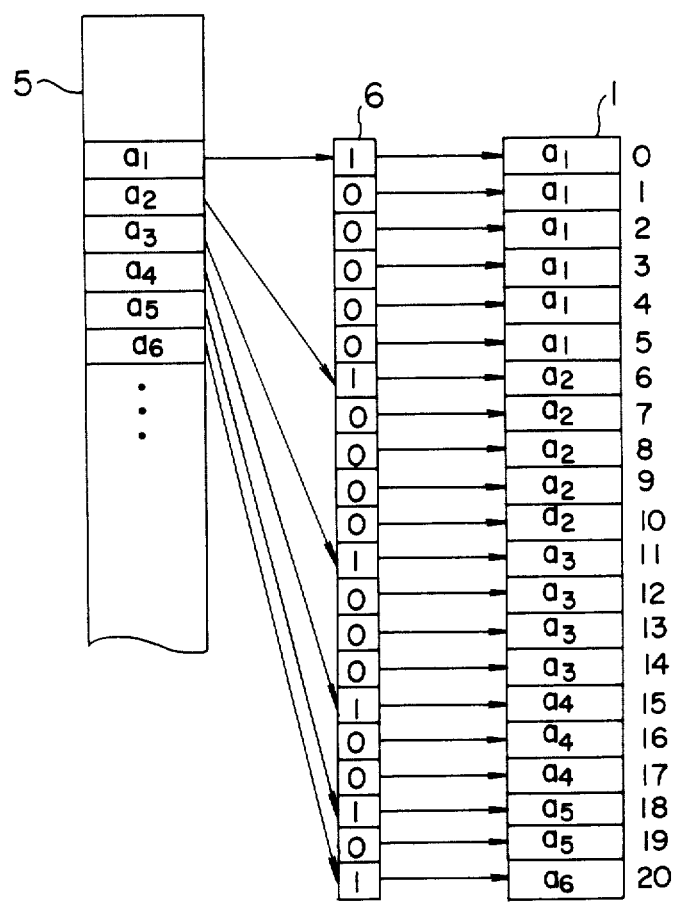
FIG. 4 is a view showing the processing for storing vector data in a vector register in accordance with the present invention.

FIG. 4 shows the processing for storing data of the main storage in the vector register in accordance with the present invention. In the previously-mentioned vector operation for the band matrix, the same data is repeatedly used. Accordingly, when data stored in the main storage 5 is read out and stored in the vector register 1, it is required to store in the vector register 1 a plurality of data which are identical with each other, and the number of which is equal to the number of times of the above repetition. If the main storage 5 is successively accessed to read out these data, a band conflict will occur. According to the present invention, data necessary for a vector operation is read out from the main storage 5 only once. The read-out data is latched, and then written in a plurality of locations of the vector register 1 in succession. Referring to FIG. 4, elements $a_1$ to $a_6$ stored in the main storage 5 correspond to the previously-mentioned elements W(1) to W(6). Prior to reading out vector element data from the main storage 5, information necessary to control both a reading operation for reading out the vector element data from the main storage 5 and a writing operation for storing the read-out data in the vector register 1, is stored in the mask register 6. The mask register 6 has a 1-bit memory area for each location of the vector register 1 where vector element data is stored.

According to the vector operation shown in FIG. 2, the elements $a_1$, $a_2$, $a_3$, $a_4$, $a_5$ and $a_6$ are required to be stored in the vector register 1 at six consecutive locations, five consecutive locations, four consecutive locations, three consecutive locations, two consecutive locations, and one location, respectively. Accordingly, in the mask register 6, a value "1" is set for the first one of consecutive locations, and a value "0" is set for the remaining ones thereof. In response to the detection of the value "1" written in the mask register 6, data is read out from the main storage 5, and the readout data is stored not only in the vector register 1 but also in a save register which is provided in the memory control unit 7. Further, in response to the detection of the value "0" written in the mask register 6, the data stored in the save register is written in the vector register 1. Such processing is carried out, while successively referring to information stored in the mask register 6, that is, "1's" and "0's". In the above processing according to the present invention, the same data is read out from the main storage 5 only once to prevent a bank conflict from occurring, and moreover a needed number of data which are identical with each other, are stored in the vector register 1.

Figure 5:
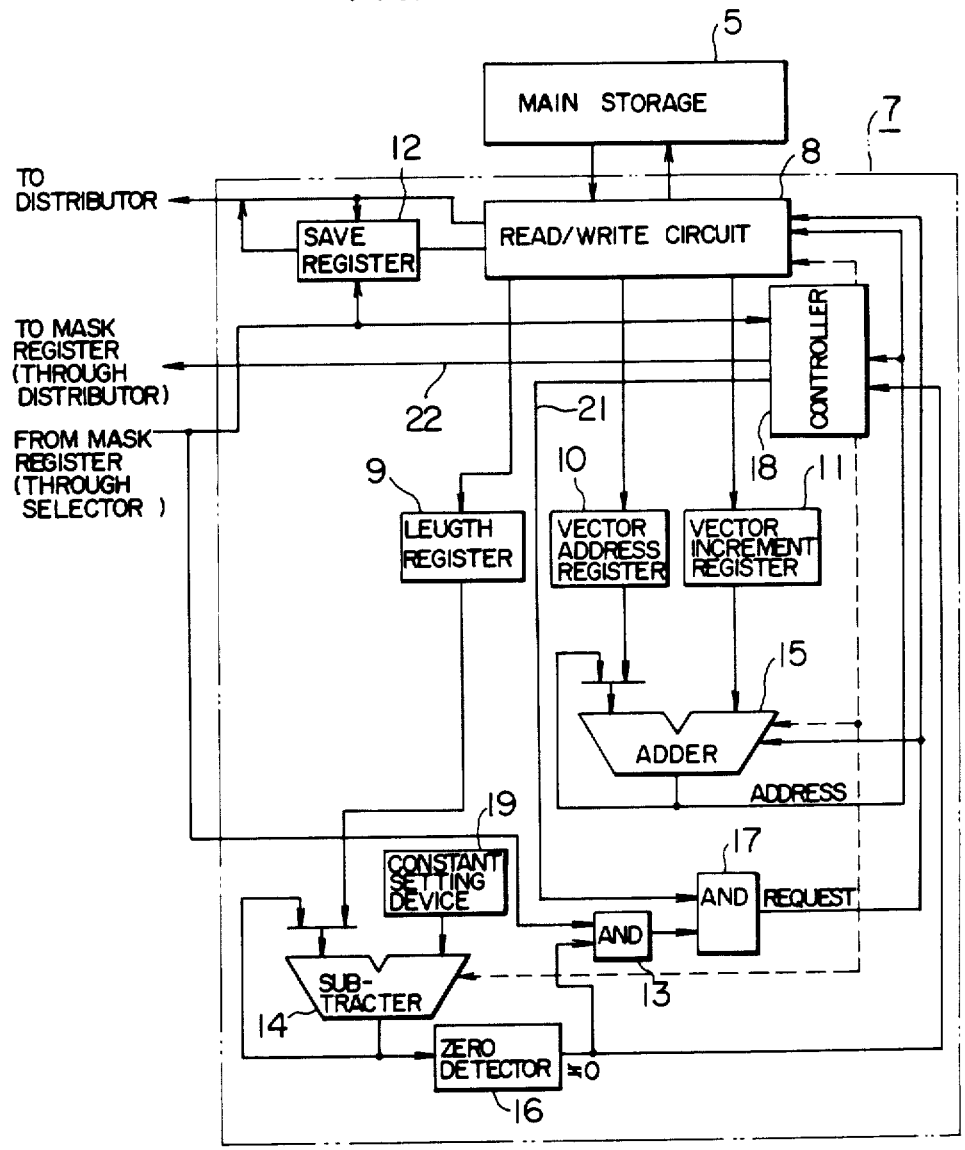
FIG. 5 is a block diagram showing part of an embodiment of a vector processor according to the present invention.
Figure 6:
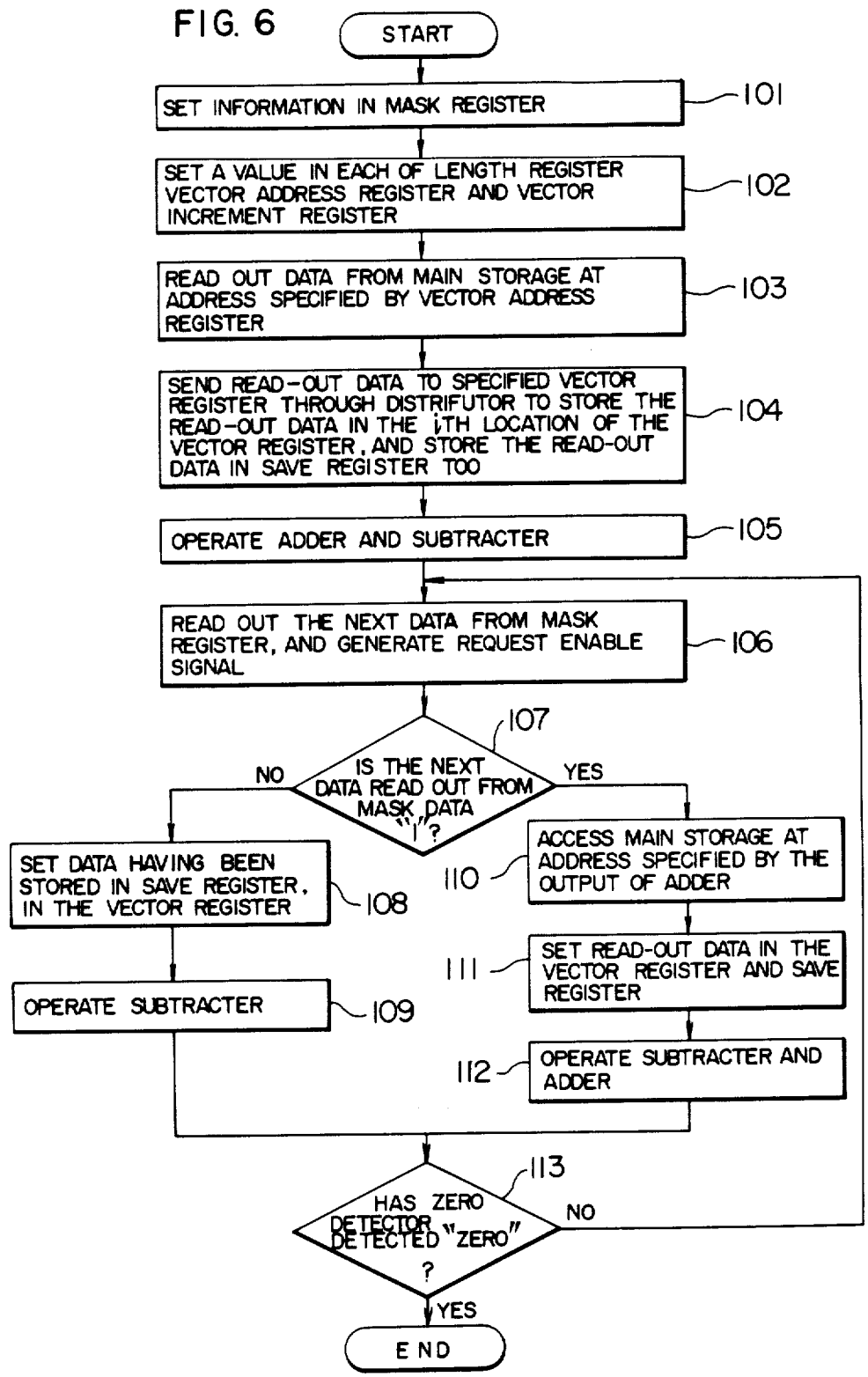
FIG. 6 is a flow chart showing the processing carried out by the controller shown in FIG. 5

FIG. 5 is a block diagram for explaining a control operation which is performed in the memory control unit 7 when vector data is stored in the vector register 1, and FIG. 6 is a flow chart showing the processing carried out by the controller 18 shown in FIG. 5.

The above control operation will be explained below in detail, with reference to FIGS. 5 and 6. At first, control information such as shown in FIG. 4 is read out from the main storage 5 and then sent through a read/write circuit 8 and the data distributor 2 to the mask register 6 to be stored therein (step 101). Next, the length of the whole vector data to be stored in the vector register 1 is read out from the main storage 5 and then set in a length register 9, the head address of vector data to be read out from the main storage 5 is set in a vector address register 10, and a difference between addresses at which one and the next vector elements are stored in the main storage, is set in a vector increment register 11 (step 102).

A controller 18 generates a request enable signal 21 and a mask register reading signal 22 periodically. One bit of information stored in the mask register 6 is successively read out, in response to the mask register reading signal 22. The information thus read out is given not only to a save register 12 but also to an AND gate 13. The value set in the length register 9 (which is equal to "21" in the example shown in FIG. 4) is first applied to one input terminal of a subtracter 14, and a value "1" set in a constant setting device 19 is applied to another input terminal of the subtracter 14. The output of the subtracter 14, that is, the result of subtraction is applied not only to a zero detector 16 but also to one input terminal of the subtracter 14. Accordingly, the value set in the length register 9 is applied to one input terminal of the subtracter 14 only at the first subtracting operation, and the result of preceding subtraction is applied to one input terminal of the subtracter 14 at the second and following subtracting operations. When the result of subtraction is not equal to zero, the zero detector 16 delivers an output signal having a level of "1".

In the example shown in FIG. 4, a value "1" is first read out from the mask register 6. Then, the AND gate 13 is made to open, since the output of the zero detector 16 has the level of "1". Accordingly, an AND gate 17 is enabled, and therefore the request enable signal 21 is delivered from the AND gate 17. Thus, first vector element data $a_1$ is read out from the main storage 5 at an address specified by the vector address register 10 (step 103). The read-out element data $a_1$ is written not only in the zero-th column of the vector register 1 but also in the save register 12 (step 104). Since one element data has been read out, an adder 15 is operated to add a value set in the vector increment register 11 to the result of preceding addition, thereby producing the result of new addition. Further, since one element data has been set in the vector register 1, the subtracter 14 is operated to subtract the value "1" from the result of preceding subtraction, thereby producing the result of new subtraction (step 105).

Next, the mask register reading signal 22 is generated to read out the next data in the mask register 6, and the request enable signal 21 is also generated (step 106). When the data read out from the mask register 6 is "0" (as in the example shown in FIG. 4), the element data $a_1$ stored in the save register 12 is written in the next column of the vector register 1 (step 108), and then the subtracter 14 is operated in the same manner as in step 105 (step 109). Since the data read out from the mask register 6 is "0", the AND gate 13 is put in the closed state. Accordingly, the request enable signal 21 cannot pass through the AND gate 17, and therefore a memory request signal is not sent to the main storage 5. When the output of the subtracter is not equal to zero (that is, the zero-detector 16 does not detect "0") in step 113, the processing in step 106 is again carried out. In the example shown in FIG. 4, the processing in steps 106, 107, 108, 109 and 113 is repeated five times, to set the element data $a_1$ in the first, second, third, fourth and fifth columns of the vector register 1.

Next, when the value "1" is read out from the mask register 6, the main storage 5 is accessed at an address specified by the output of the adder 15 (step 110). Element data $a_2$ read out from the main storage 5 is set not only in the next column (namely, the sixth column) of the vector register 1 but also in the save register 12 (step 111), and then the subtracter 14 and adder 15 are operated in the same manner as in step 105 (step 112).

The processing in steps 107 to 113 is repeated while referring to data read out from the mask register 6, until the result of subtraction, namely, the output of the subtracter 14 becomes equal to zero. When the result of subtraction becomes equal to zero, the output of the zero detector 16 informs the controller 18 that all element data have been set in the vector register 1, to terminate the processing. Thereafter, the AND gate 13 is kept at the closed state, and therefore the memory request signal is never sent to the main storage 5.

As has been explained in the foregoing, according to the present invention, all vector element data necessary for a vector operation can be stored in a vector register without causing any bank conflict.

We claim:

1. A vector processor provided with a vector register having a plurality of storage locations each capable of storing vector element data, and in which said vector element data is read out from a main storage for use in performing a vector operation, said vector processor comprising:

first register means connected to receive data from said main storage for latching vector element data read out from said main storage;

second register means for storing control information for each of said storage locations of said vector register indicating whether vector element data in said main storage is to be read out or not for the storing of vector element data in said storage locations; and control means connected to said second register means and responsive to said control information for selectively controlling the read-out of vector element data from said main storage and the subsequent storing of that vector element data in one of said storage locations of said vector register and in said first register means, or controlling the storing of vector element data which has already been stored in said first register means into a storage location of said vector register.

2. A vector processor according to claim 1, wherein said second register means stores said control information as one or the other of two binary values for each of said storage locations of said vector register, and wherein said control means includes means for reading out a vector element data from said main storage and for setting that vector element data in said vector register and said first register means in response to one binary value of said control information, and for reading out a vector element data from said first register means and for setting that vector element data in said vector register in response to the other binary value of said control information.

3. A vector processor according to claim 1, wherein said control means includes means for reading out vector element data from said main storage at addresses which differ from each other in successive reading operations.

* * * * *